(No Model.) 3 Sheets—Sheet 1.
T. WALKER & O. G. BARLOW.
COMBINED SEEDER, ROLLER, AND HARROW.

No. 331,588. Patented Dec. 1, 1885.

Witnesses:
Jas. T. DuHamel.
R. S. Ferguson

Inventors:
T. Walker &
O. G. Barlow.
by Dodge & Son
Attys (No Model.) 3 Sheets—Sheet 2.
T. WALKER & O. G. BARLOW.
COMBINED SEEDER, ROLLER, AND HARROW.
No. 331,588. Patented Dec. 1, 1885.
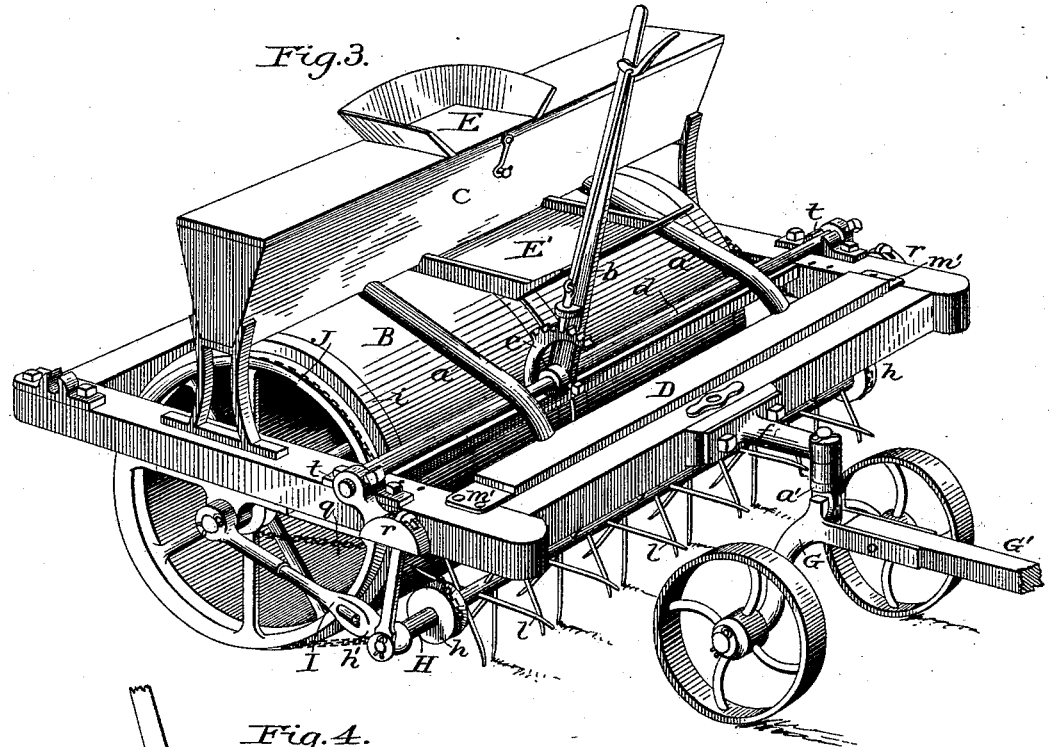
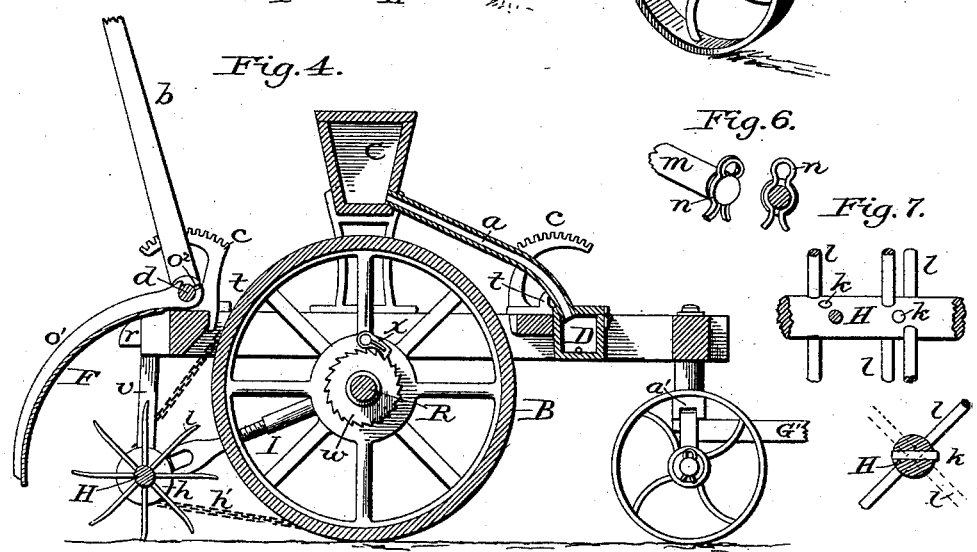
Witnesses:
Jas. F. DuHamel
R. S. Ferguson
Inventors:
T. Walker &
O. G. Barlow
by Dodge & Son
Attys (No Model.) 3 Sheets—Sheet 3.
T. WALKER & O. G. BARLOW.
COMBINED SEEDER, ROLLER, AND HARROW.
No. 331,588. Patented Dec. 1, 1885.
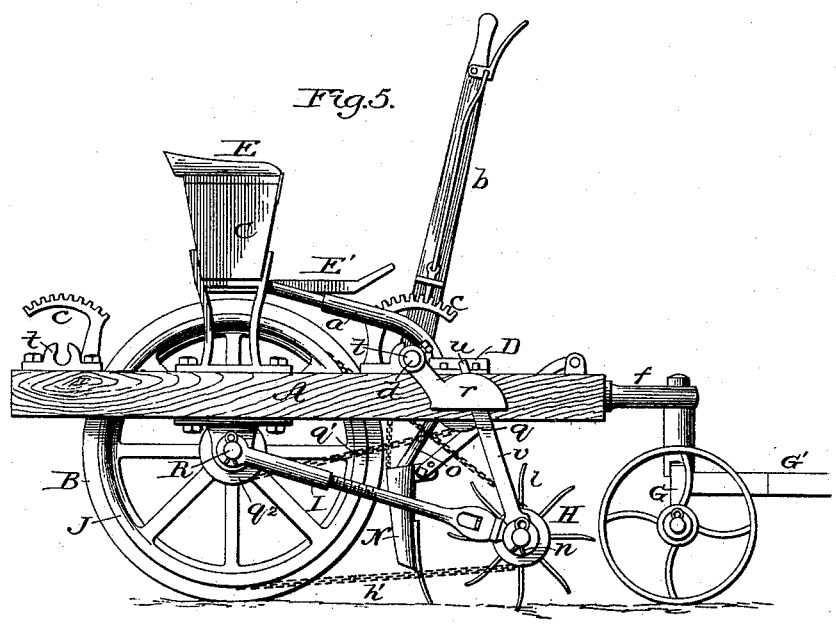
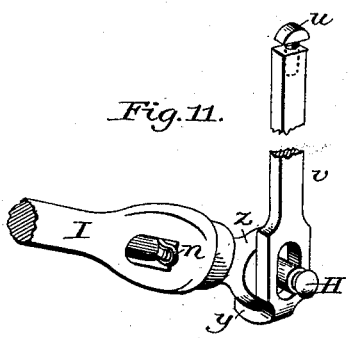

UNITED STATES PATENT OFFICE.

THOMAS WALKER AND ORRIN G. BARLOW, OF PORTLAND, OREGON.

COMBINED SEEDER, ROLLER, AND HARROW.

SPECIFICATION forming part of Letters Patent No. 331,588, dated December 1, 1885.

Application filed August 12, 1885. Serial No. 174,210. (No model.)

*To all whom it may concern:*

Be it known that we, THOMAS WALKER and ORRIN G. BARLOW, of Portland, in the county of Multnomah and State of Oregon, have invented certain new and useful Improvements in a Combined Seeder, Roller, and Harrow, of which the following is a specification.

Our invention relates to that class of agricultural implements known as "combined machines," designed more especially for seeding, harrowing, and rolling; and the invention consists in a novel construction and combination of the various parts, whereby the machine is adapted to be used in a variety of ways and for various purposes, as hereinafter more fully set forth.

Figure 1:
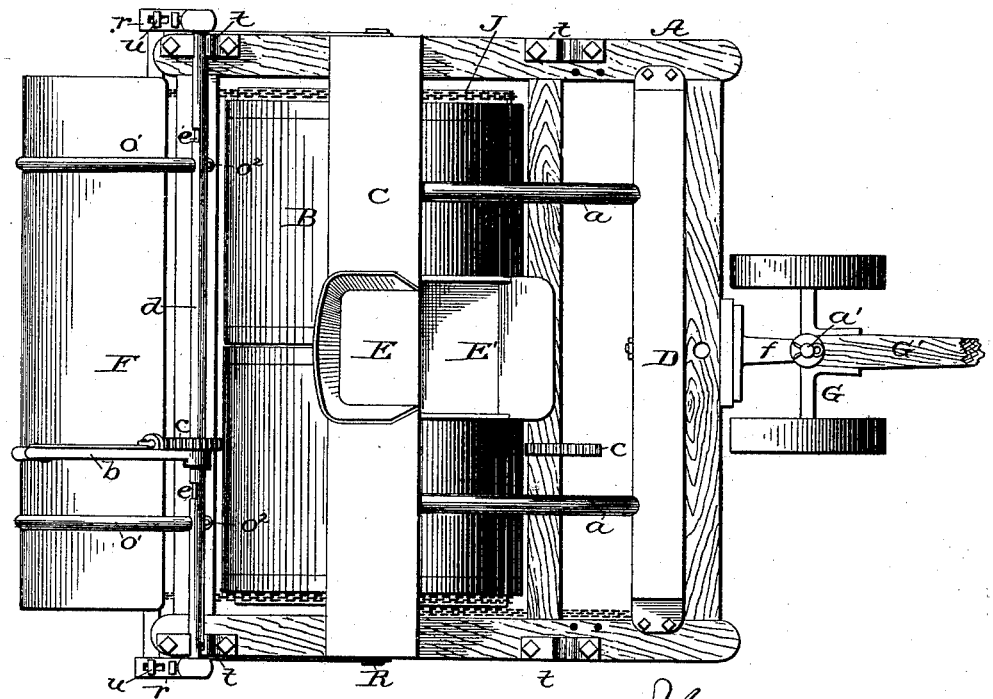
Figure 2:
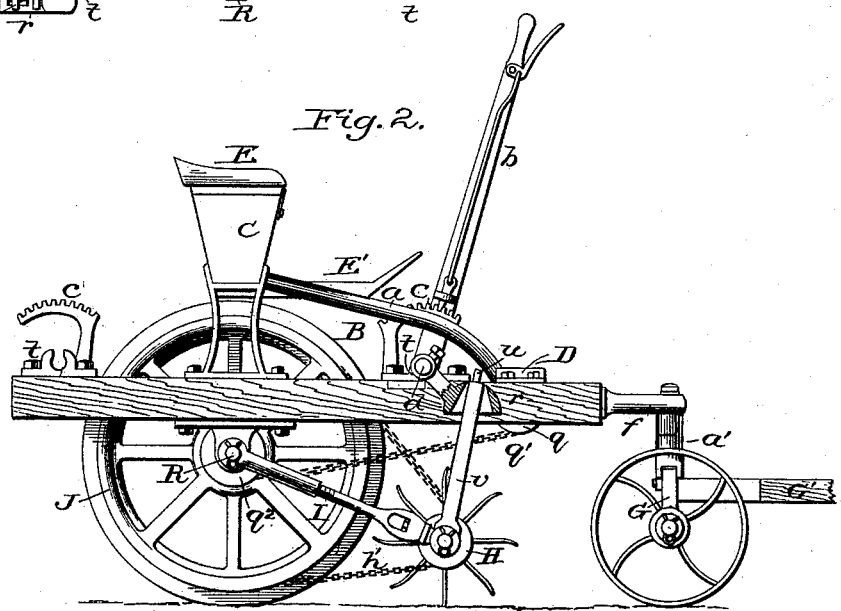

Figure 1 is a top plan view; Fig. 2, a side elevation. Fig. 3 is a perspective view; Fig. 4, a longitudinal vertical section; Fig. 5, a side elevation with drill-teeth attached; and Figs. 6, 7, 8, 9, 10, and 11 are views of parts shown in detail.

To construct a machine on our plan, we make a rectangular frame, A, the front end of which is supported on a truck consisting of a bent axle, G, supported by a pair of wheels, as shown in Figs. 1 and 3, having a tongue, G', pivoted to it, the axle being pivoted to an upright, a', which in turn is journaled in a rigid arm, f, bolted to the front of the frame A, so that the truck can be turned in any direction, either wheel pass over an elevation or into a hollow, and the tongue be free to rise and fall independently of the main frame and the parts carried thereon. The main frame A has an axle, R, mounted in suitable boxes about one-third of its length from its rear end, and on this axle two rollers, B, are mounted, so as to turn loosely thereon, these rollers preferably being made of staves of wood having their ends held in grooved metal heads $i$, Fig. 3, as is customary, though, if preferred, the rollers may be made of iron, both styles of rollers being well known. To the axle R, at each end and outside of the rollers B, a grooved chain-wheel, J, is rigidly secured, so as to turn with the axle, and on the inside of the hub of these drive-wheels J, or close to its inner side, a ratchet-wheel, W, is secured, as shown in Fig. 4, said ratchet-wheel, whether being formed on the wheel J or independently of it, being secured to the axle R so as to turn therewith. To the hub of the rollers B a pawl, $x$, is pivoted, as shown in Fig. 3, and which, as the rollers are rotated by drawing the machine forward, engage with the ratchet-wheels $w$, and thereby impart motion to the drive-wheels J, and, as there is one of these drive-wheels at each side of the machine, it follows that one or the other of them will have motion imparted to it whichever way the machine may be turned in turning about. Upon the frame, above the rollers, is located a seed-box, C, which is designed to be used as a reservoir to contain a large amount of seed, from which the seed flows gradually through two or more tubes, $a$, to a distributing-hopper, D, located at the front end of the frame, as shown in section in Fig. 4, this hopper D being provided with any suitable style of seed-distributing apparatus, to which motion is imparted by a chain, $q'$, passing around a pulley, $q^2$, on the axle R, Fig. 2, and a corresponding pulley, $q$, on the feed-shaft in hopper D. Any of the known forms of feeding devices may be used, and as these are well known it is unnecessary to describe them. If desired, a gate or gates may be arranged within the hopper C to regulate or shut off the flow of the seed therefrom; but as the lower hopper, D, is provided with a cover and means for holding it shut, it will always be kept full of seed, and thus it will be seen that the seed from hopper D will at all times be fed out under a uniform pressure. When thus arranged, the machine is designed to deliver the seed broadcast; and, if desired, a delivering or scattering board may be arranged under hopper D and be made reversible, so it can be inclined to throw the grain forward or back, as may be desired, such delivery or scattering devices being well known, and therefore unnecessary to show or describe.

In Fig. 5 we have shown the machine provided with drill teeth or hoes N, attached by drag-bars to the front of the frame A, with grain-tubes $o$, by which the grain can be sown in drills when desired, these devices being detached and laid aside when it is desired to sow the grain broadcast. We construct a rotary harrow, H, by using a shaft of the proper length, boring a series of holes through it, and inserting therein a series of teeth, $l$, as shown more clearly in Fig. 7, in which it will be observed that each adjoining pair of teeth are arranged at right angles, and so close to each other that a hole bored diagonally through the shaft between these adjoining teeth will cut slightly into the side of each, so that a pin, k, driven into said hole, will lock the two firmly in place. This form of teeth will ordinarily be used for covering the grain, and also for harrowing the ground for any purpose desired; but we also propose to use other forms of teeth, more in the form of cultivator teeth or shovels, especially for working summer fallow and similar purposes, and in that case the shanks of these teeth or shovels will be constructed and attached as shown in Fig. 9. In this case it will be observed that the shanks l and l', projecting from opposite sides of the shaft, are made of separate pieces, their ends which fit in the hole in the shaft being made wedge-shaped, so that when the two are inserted they will fill the hole, as shown. The outer one, l', of each pair has a hook-like projection, n', formed on its end, so that when inserted in the hole first it will engage with the opposite side of the shaft, and when the other shank, l, is driven in the shank l' will be held firmly in place, and then by inserting the pin k in the hole between this and the adjoining pair l and l', arranged in the same way, they will all be locked firmly in place by the one pin. This rotary harrow thus constructed we attach to the projecting ends of the axle R by swinging arms I, as shown in Figs. 2, 3, 4, and 5, these arms I being made of two parts, one of which screws into the other, as shown, so the arms can be lengthened or shortened at will, and thus throw the harrow farther from or nearer to the rollers B, either in front or rear, as may be desired, and also for tightening the drive-chain.

As shown in Fig. 11, the arm I is connected to the shaft H by an eye or bearing, z, which has a neck fitted loosely in a hole in the end of arm I, where it is held by a spring-key, n, (to be hereinafter described,) whereby the lower part of the arm I is free to be turned to lengthen or shorten the arm without detaching any of the parts.

It is obvious that other plans may be used for changing the length of the arms I—such, for instance, as making them of two flat bars, lapped one upon the other, with a series of holes, or, better still, a slot, with one or more bolts for fastening them together, the result being the same. We prefer the plan shown, however, as we consider it the best.

For the purpose of raising the harrow from the ground when moving the machine from point to point, or when it is desired to use the rollers without the harrow, we provide a rock-shaft, d, which is mounted in open boxes or bearings t, secured upon the frame A, as shown in Figs. 1, 2, 3, 4, and 5, there being two sets of these boxes, one set being in front and the other set in rear of the rollers B, for a purpose hereinafter explained. This rock-shaft d is provided at each end with an arm, r, provided at their outer ends with a vertical slot, as shown more clearly in Fig. 2, in which is secured loosely the upper end of a pendent bar or rod, v, the lower end of which, as shown more clearly in Fig. 11, is slotted to receive the end of the harrow-shaft H, and has also a hook, y, on it to engage under the eye-piece z of arm I. In the upper end of each of these pendent rods v is secured a swiveled T-shaped piece, u, of such a size that when turned in line with the slot in arm r it will readily pass through the same, but which when turned crosswise of the slot, as shown in Fig. 3, will lock the pendant v to the arm r, so that when the arms r are raised by the rock-shaft d they will raise the harrow from the ground.

To operate the rock-shaft, there is secured to it a lever, b, which has a pawl attached to engage in the notches of a curved rack, c, secured to the frame alongside of the lever, as shown, and by means of which the harrow can be carried suspended or can be adjusted to work at any required depth in the ground.

As shown in Fig. 2, the pendent rods v are arranged to play freely up and down in the slots of the arms r, whereby the harrow is free to adapt itself to any inequalities of the surface when in operation. At each end the shaft of the harrow is provided with a pulley, h, around which a chain, h', passes from the drive-wheel J, and thus motion is given to the harrow whether the machine be drawn in a direct line or is being turned, and thus it is caused to operate upon all parts of the surface, at the ends of the field where it is turned around as well as elsewhere. As the arms I are pivoted upon the ends of the axle R outside of the boxes, it will be seen that by turning the swiveled keys u so as to disconnect the pendants v from the arms r of the rock-shaft, the arms I can be swung from the front to the rear of the rollers B, and the harrow thus be brought in rear of the rollers, as shown in Fig. 4. At the same time the rock-shaft b, with its attachments, will be lifted out of its front boxes, t, and be turned around and set in the rear set of boxes, and the pendants v be connected to the arms r the same as before.

To enable the rock-shaft to be thus detached and changed from one position to the other, the shaft d and its boxes t are constructed as shown in Fig. 8, in which it will be seen that the opening or bearing in which the shaft rests is circular and of the full size of the shaft, and from which an opening extends out through the top of the box slightly narrower than the diameter of the shaft. At the points where the shaft fits in these boxes t it is cut away on one side, so that when turned edgewise it will enter the narrow slot or opening, and when dropped to its seat and turned partly around in the box it will be held therein against displacement. To enable the shaft to be thus turned, it is only necessary to disconnect its pawl on lever b from the rack c and swing the lever over to a horizontal position, or nearly so, when it can be lifted out of its boxes. We also provide a guard, F, shown in Figs. 1 and 4, to be attached to the rock-shaft $d$ when the harrow is to be used behind the rollers, to prevent the earth and clods from being thrown upon the machine by the harrow. This guard consists of curved sheet of metal or wood, preferably galvanized sheet-iron, and is secured to two or more curved arms, $o'$, the inner ends of which project beyond the upper edge far enough to have formed therein slots or openings of sufficient size to slip onto the shaft $d$ at points where it is cut away or flattened on one side, as shown at $e\,e$, Fig. 1, and when fairly on the shaft they are slid along the shaft a short distance, far enough to carry the arms $o'$ away from the flattened points $e$, and bring them opposite pins $o^2$, which project from the shaft $d$, and against which the ends of said arms bear, as shown in Figs. 1 and 4, thereby preventing the guard from dropping down, and locking it to the shaft $d$, so as to be raised thereby whenever the latter is turned to elevate the harrow.

It will be understood that the openings in the arms $o'$ are constructed the same as those of the boxes $t$, in which the shaft $d$ has its bearings, so that by sliding the arms $o'$ along to the points $e$ on the shaft $d$ the guard can be detached without the use of any tool whatever. The end of the arms $o'$ where they bear against the pins $o^2$ are also notched or have a slot cut in them, which engaging with the pins $o^2$ prevents the guard from moving endwise until its outer or lower edge has been raised sufficiently to disengage the ends of the arms $o'$ from the pins $o^2$.

In order to enable the parts to be readily detached and avoid the use of nuts and screws and tools for operating them, we make use of a spring-key, $n$, at all points where a fastening device is required, as shown, for instance, on the ends of the main axle R, on the ends of harrow on the truck-axle G, the journal $a'$ which connects the truck to the main frame, &c. This key is shown in Fig. 6 and enlarged in Fig. 10, and it consists of a piece of flat steel bent to a nearly-circular form, so as to enable it to be forced around the journal or part to which it is to be applied, and rest in a groove, $p$, formed for it, as shown clearly in Figs. 6 and 10. Where the journal or stud $m$ is small and a small key is required, this key $n$ may be bent in the form shown in Fig. 6; but where a larger one is required—as, for instance, on the main axle—it will preferably be formed as shown in Fig. 10, with a portion reduced at the center to form the spring part. In either case its open ends should be either bent outward, as shown in Fig. 6, or be curved, as in Fig. 10, so as to enable it to be readily shoved into place. As it bears on the journal or stud for much the larger part of its circumference, and is held thereon by its spring action, it will readily be seen that it forms a secure fastening and one that is not not liable to become detached or lost.

The distributing seed-hopper D is made adjustable forward and back on the frame A to enable the grain to be thrown either in front or in rear of the harrow H, when the latter is adjusted in front of the rollers, and also to adapt it for use with the drill teeth or hoes N. As shown in Fig. 1, the hopper D is held at each end by a plate, $m'$, which rests on the side bars of the frame, and is secured thereto by a couple of bolts. To adjust the hopper, it is only necessary to remove the bolts, shove the hopper back, and insert the bolts in another set of holes provided for that purpose; or, if preferred, the plates $m'$ may be slotted lengthwise of the machine, and made of such a width as to permit the hopper to be moved the requisite distance by merely loosening the bolt or bolts without removing them from the slots. To enable this adjustment of the hopper D to be made the more readily and still keep it in connection with the supply-hopper C, we make the tubes $a$, which connect the two hoppers, in two parts, as shown in Fig. 5, the one part telescoping or sliding on the other. This, however, is only necessary when the hopper D is required to be moved some considerable distance, as when it is to be moved a short distance only, the lower ends of the tubes $a$ may slide into the hopper D, and in such case a continuous or single tube will answer.

As shown in Figs. 1 and 3, a seat, E, for the driver is located centrally on the hopper C with a foot-board, E', below and in front of the same, the lever $b$ being within easy reach both when in front and in rear.

Another object and advantage of the swiveled boxes $z$ is to permit either end of the harrow to rise or fall as it passes over uneven surfaces without binding in its bearings, the slots in pendants $v$ being for the same purpose.

By this construction and arrangement of the various parts we are enabled to produce a combined machine that is adapted to a great variety of uses. It can be used simply as a roller for crushing clods, &c., by raising or detaching the harrow, or it can be used as a combined harrow and roller, or be made to first roll and then harrow the ground, or can be used to sow seed broadcast in front or in rear of the harrow, or can be used as a grain-drill, with or without harrowing, or by changing the seed-delivering apparatus can be used for planting corn and similar seeds in hills or in drills, as may be desired.

By combining the supply or reservoir hopper with the distributing-hopper it can carry sufficient grain for seeding large areas, thereby especially adapting it for use on the large wheat and other farms of the Pacific coast and the northwest, the large bearing-surface of the rollers enabling it to carry a much larger supply than the ordinary grain-drill with its narrow wheels can, and the added weight of the grain serving to give greater efficiency to the rollers.

Having thus fully described our invention, what we claim is—

1. In a combined machine, the combination of two or more rollers mounted in a suitable frame and having drive-wheels J, connected to said rollers by ratchets and pawls, and a rotating harrow connected to the axle by pivoted arms and to the drive-wheels by chains, the said parts being arranged to operate substantially as described, whereby a continuous rotation is imparted to the harrow whether the machine be moved in a straight line or be made to move in a circle in either direction, as set forth.

2. The combination of the rollers B, drive-wheels J, connected thereto by ratchets and pawls, the rotating harrow H, connected to the axle R by the swinging arms I, and the rock-shaft d, provided with the arms r, connected to the harrow by pendants v, with a rack, c, and pawl on the lever for suspending or adjusting the harrow, all arranged and operating substantially as set forth.

3. In combination with the rollers B, having drive-wheels J, connected thereto by ratchets and pawls, the rotating harrow arranged and adapted to be used either in front or in rear of the rollers, as set forth.

4. In combination with the frame A, carrying the rollers B, and drive-wheels J with the reversible rotary harrow, the shifting rock-shaft d, constructed and arranged to be shifted from front to rear of the machine, and vice versa, substantially as and for the purpose set forth.

5. The combination of the rollers B, each connected by a ratchet and pawl to its drive-wheel J, a rotary harrow, and a seed-hopper containing suitable seed-distributing device, said harrow and distributing device both being operated by the driving-wheels at opposite sides, so as to continue them in operation whichever way the machine may be turned, substantially as shown and described.

6. The combination of the stationary supply-hopper C and the distributing-hopper D, the latter being made adjustable to and fro on the frame, and connected to the supply-hopper by telescopic tubes a, substantially as and for the purpose set forth.

7. In combination with the open-mouthed boxes or bearings t, the rock-shaft d, having its sides cut away at the points where it enters said boxes, whereby said shaft can be readily attached or detached and be held securely in place, substantially as set forth.

8. The longitudinally-adjustable arms I, constructed and arranged to operate in combination with the rollers B and rotating harrow H, substantially as described.

9. The combination, with the rotating harrow, of the swinging arms I and the swiveled bearings z, whereby the opposite ends of the harrow are enabled to rise or fall independently and without binding in its bearings, substantially as and for the purpose set forth.

10. In a seeding-machine having a rotating harrow attached, the adjustable and detachable guard F, constructed and arranged to operate substantially as and for the purpose set forth.

11. The spring-key n, constructed to clasp around a journal or stud and rest in a groove formed therein for securing the parts, substantially as shown and described.

12. The harrow-shaft H, having its teeth l l' located in transverse holes extending through said shaft at different angles, and locked therein by a pin or key, k, inserted in a hole between the adjoining teeth or shanks of each pair or set, substantially as shown and described.

THOMAS WALKER.
ORRIN G. BARLOW.

Witnesses:
J. FRED CLARK,
GEO. H. CLARK.